(12) United States Patent
Eberle

(10) Patent No.: US 6,425,622 B2
(45) Date of Patent: Jul. 30, 2002

(54) CONVERTIBLE MOTOR VEHICLE ROOF

(75) Inventor: Andreas Eberle, Munich (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/782,512

(22) Filed: Feb. 14, 2001

(30) Foreign Application Priority Data

Feb. 14, 2000 (DE) .......................................... 100 06 296

(51) Int. Cl.[7] .................................................. B60J 7/00
(52) U.S. Cl. .................................. 296/108; 296/107.16
(58) Field of Search ................................ 296/108, 109, 296/114, 116, 107.17, 107.16, 107.18

(56) References Cited

U.S. PATENT DOCUMENTS

| 5,542,735 A | | 8/1996 | Fürst et al. | |
| 5,769,483 A | * | 6/1998 | Danzl et al. | ............ 296/108 X |
| 5,979,970 A | * | 11/1999 | Rothe et al. | ........ 296/107.18 X |
| 6,053,560 A | * | 4/2000 | Rothe | ......................... 296/108 |

FOREIGN PATENT DOCUMENTS

| DE | 43 26 255 | 9/1994 |
| DE | 196 42 152 | 4/1998 |

* cited by examiner

Primary Examiner—Joseph D. Pape
Assistant Examiner—Jason Morrow
(74) Attorney, Agent, or Firm—Nixon Peabody LLP; David S. Safran

(57) ABSTRACT

A convertible motor vehicle roof (1) with a main roof element (3) and at least one other roof element (2, 4), which are movably joined to one another, and with a main bearing mechanism (6) which pivotally mounts the main roof element (3) on the body and transfers the former in the opening process of the motor vehicle roof, together with the roof element (2, 4) coupled thereto, into a stowed position, the coupled roof element (2) being moved via its connecting means (13) which is controlled by the main bearing means (6) during motion of the main roof element (3) roughly parallel to, under or over the main roof element (3) when the main roof element (3) which is supported on the body side is pivoted by the main bearing means (3).

16 Claims, 7 Drawing Sheets

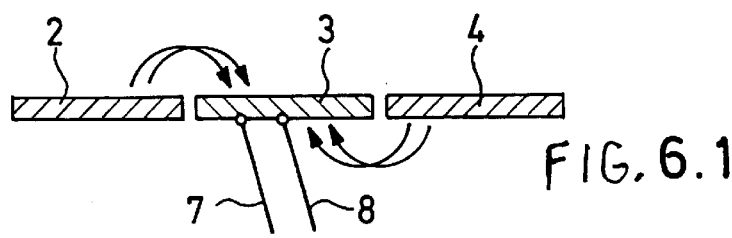
FIG. 6.1
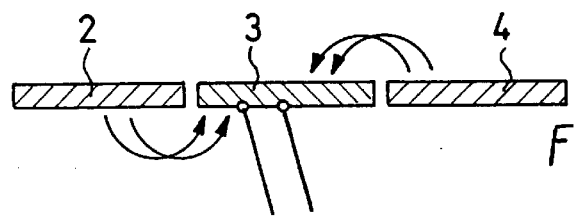
FIG. 6.2
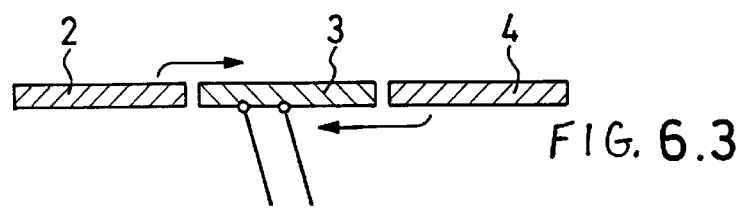
FIG. 6.3
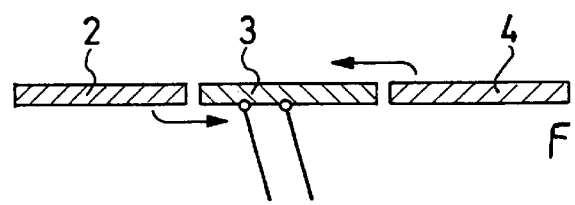
FIG. 6.4
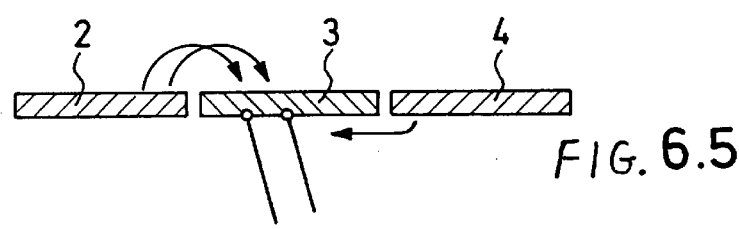
FIG. 6.5
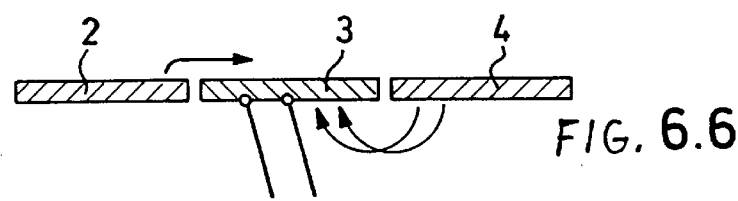
FIG. 6.6
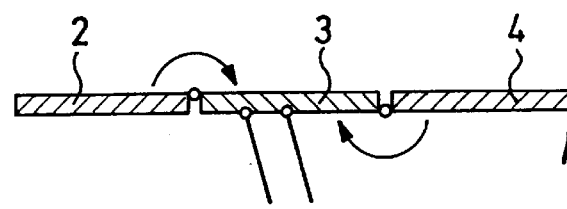
FIG. 6.7

CONVERTIBLE MOTOR VEHICLE ROOF

BACKGROUND OF THE INVENTION

1. Field of the Invention

The invention relates to a convertible motor vehicle roof with a main roof element and at least one other roof element which are movably joined to one another, and with a main bearing mechanism which pivotally mounts the main roof element on the body and transfers the main roof element together with the roof element coupled thereto into a stowed position in the opening process of the motor vehicle roof.

2. Field of the Invention

Published German Patent Application DE 196 42 152 discloses a motor vehicle roof of the initially mentioned type in which the roof is divided into a front, a middle and a rear component piece which can be transferred from a common closed position which covers the motor vehicle interior into an open position as it is deposited in a rear-side box for the folding roof. The front and the middle component roof piece as well as the middle and rear component roof piece are joined to one another via a respective articulated joint. The rear component roof piece is supported to be able to pivot via a rod arrangement on the body. In the opening process, first the rear component roof piece together with the front and middle component roof piece is pivoted as a rigidly coupled unit around the body-side support counter to the direction of forward travel, the front component roof piece being raised comparatively high over the motor vehicle. Then, the front component roof piece is moved out of this pivot position to under the middle component roof piece and the two are shifted with a synchronous lowering motion to under the rear component roof piece. Finally, all three component roof pieces are inserted into the box for the folding roof in a pivoting-pushing motion.

German Patent DE 43 26 255 C1 and corresponding U.S. Pat. No. 5,542,735 disclose a motor vehicle roof which has a B column laterally on each side, the B column being supported to pivot and move lengthwise in a body-mounted guide which runs roughly horizontally over the rear axle in the lengthwise direction of the motor vehicle. One roof part is pivotally mounted on the B-column and extends from the B-column forward in the direction toward the front window. To open and lower the motor vehicle roof, first the rear window is moved under the roof part and the two rear triangular windows are lowered. Then, the B-column is moved by means of a drive, as a unit together with the roof part and the rear window, to the rear lengthwise along the guide while maintaining its vertical position. In the rear position the roof part is folded down towards the B column and in the direction of a stowage space. To completely lower the roof into the stowage space behind the seats, the B-column is pivoted forward relative to the guide, the angular position of the roof part being adapted to the B-column and moved forward by a certain amount.

SUMMARY OF THE INVENTION

The primary object of the invention is to devise a motor vehicle roof of the initially mentioned type which has at least two lowerable roof elements which can be transferred into the stowed position in an improved lowering motion.

This object is achieved in accordance with the invention in the aforementioned motor vehicle roof by the coupled roof element being moved via its connecting means, which is controlled by the main bearing mechanism, during the motion of the main roof element under or over the main roof element roughly parallel thereto when the main roof element, which is supported on the body, is pivoted by the main bearing mechanism. Since the roof element is moved over or under the main roof element during the pivoting motion of the main roof element, the height to which it is pivoted out is much less than in the initially named motor vehicle roof. Thus, the roof can also be opened when driving, the incident wind forces being greatly reduced.

The main bearing during the pivoting motion of the main roof element is preferably the main four-bar mechanism with which the main roof element can be easily guided in a parallel pivoting motion into the stowed position. Also, the connecting means between the main roof element and the other roof element is feasibly a four-bar mechanism which is connected to the main bearing means or the main four-bar mechanism in a connection which transfers motion. However, other types of joints and kinematic connections can be used to achieve the desired motions.

The four-bar mechanism is advantageously connected via a coupling rod to the elements which can be moved by the main four-bar mechanism.

The motor vehicle roof can in addition to the main roof element have two or three other roof elements which are supported to be able to move toward one another. Thus a larger motor vehicle roof can be divided into several smaller rigid roof elements which have better stowage behavior in a small stowage space.

The individual roof elements can be arranged differently. Thus, the main roof element can be located between the roof elements. On the other hand, the two roof elements can be located in the direction of travel in front of or behind the main roof element. During motion, for example, the front roof element can be displaced over the middle main roof element and the rear roof element can be displaced under the middle main roof element, in the same way as the front roof element can be displaced under the middle main roof element and the rear roof element can be displaced over the middle main roof element.

In various configurations, the two roof elements can be attached to the middle main roof element with identical or different connecting means and the connecting means can be designed for parallel pivoting, for translational displacement or for folding around a joint under or over the middle main roof element. Preferably, at least two roof elements are movably connected to the middle main roof element by means of the four-bar mechanism, slide guides, or pivoting joints or by combinations thereof.

One embodiment calls for there to be an additional roof element on the rear roof element which can be moved by means of an articulated connection, especially an additional four-bar mechanism, and which is dynamically coupled to the main bearing means or to the rear four-bar mechanism.

Furthermore, the motor vehicle roof can additionally have a rear section with a roof or roof column element which can be lowered via a rear mechanism and the main bearing means can be coupled via a coupling means to the rear mechanism. One such coupling can be effected mechanically, electrically or hydraulically. Preferably, the coupling takes place by a coupling rod which connects the main bearing means to the rear mechanism.

On the other hand, coupling can also take place electronically via a respective drive on the main bearing means and on the rear mechanism, or hydraulically via a common drive for the main bearing means and the rear mechanism.

In the following, embodiments of the motor vehicle roof are explained in detail with reference to the accompanying drawings.

BRIEF DESCRIPTION OF THE DRAWINGS

FIGS. 6.1 to 6.7 each schematically depict a respective example of a manner in which the roof elements can be deposited.

DETAILED DESCRIPTION OF THE INVENTION

Figure 1:
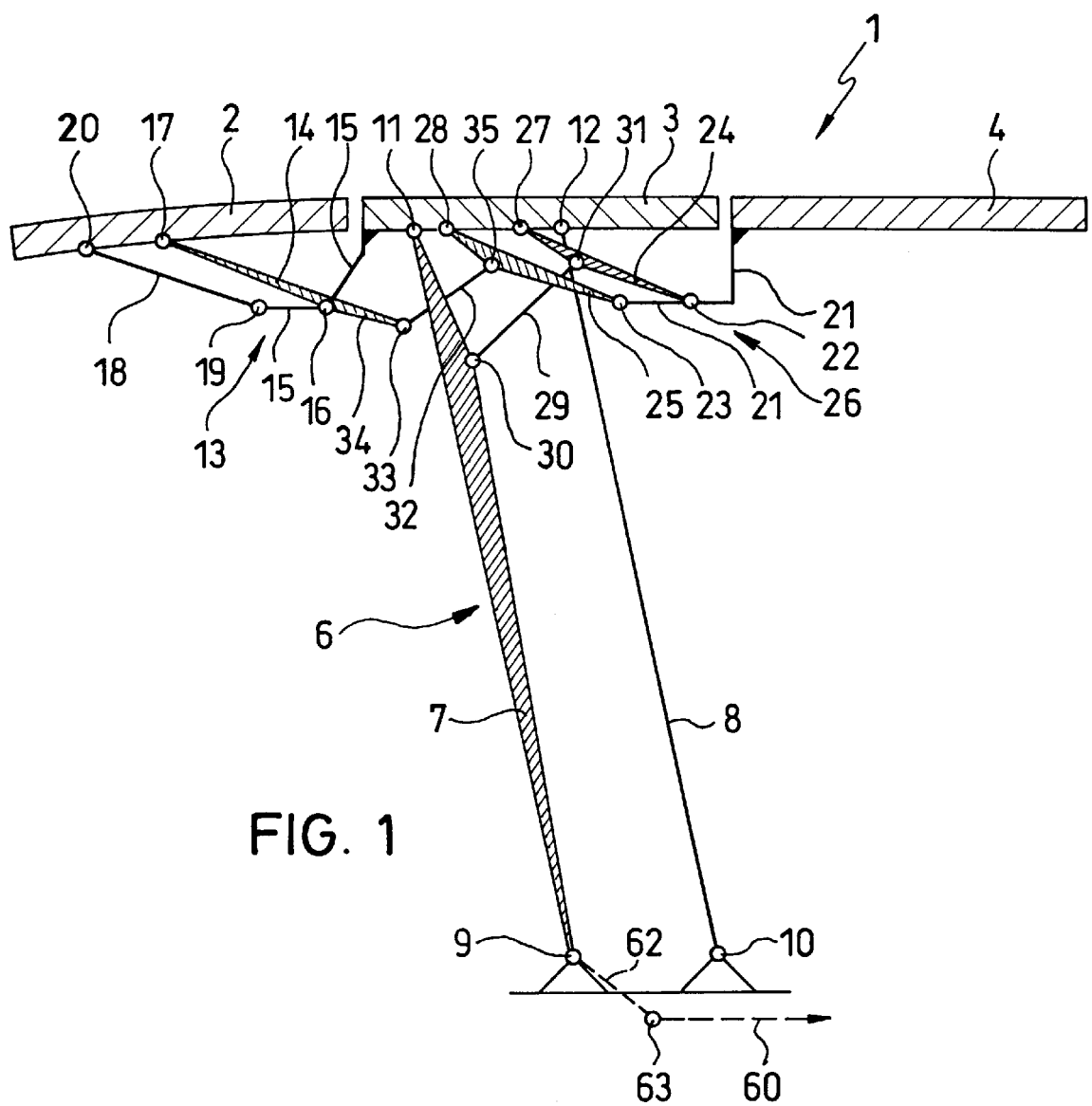
FIG. 1 is a side view schematically showing a convertible motor vehicle roof with three roof elements in the closed position.
Figure 2:
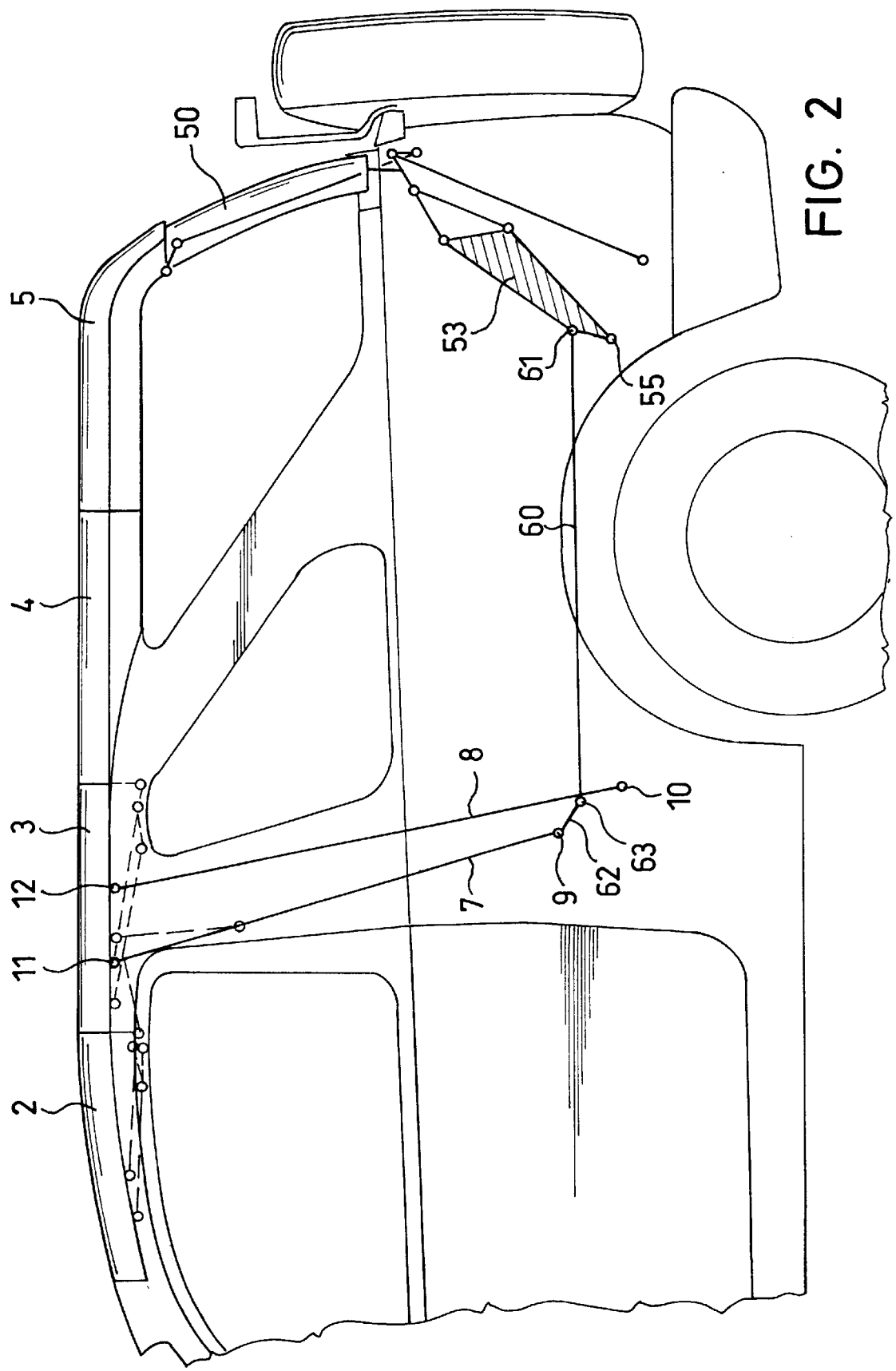
FIGS. 2 to 5 each schematically shows a respective position of the motor vehicle roof as it is moved from the closed position (FIG. 2) to the open position (FIG. 5)
Figure 3:
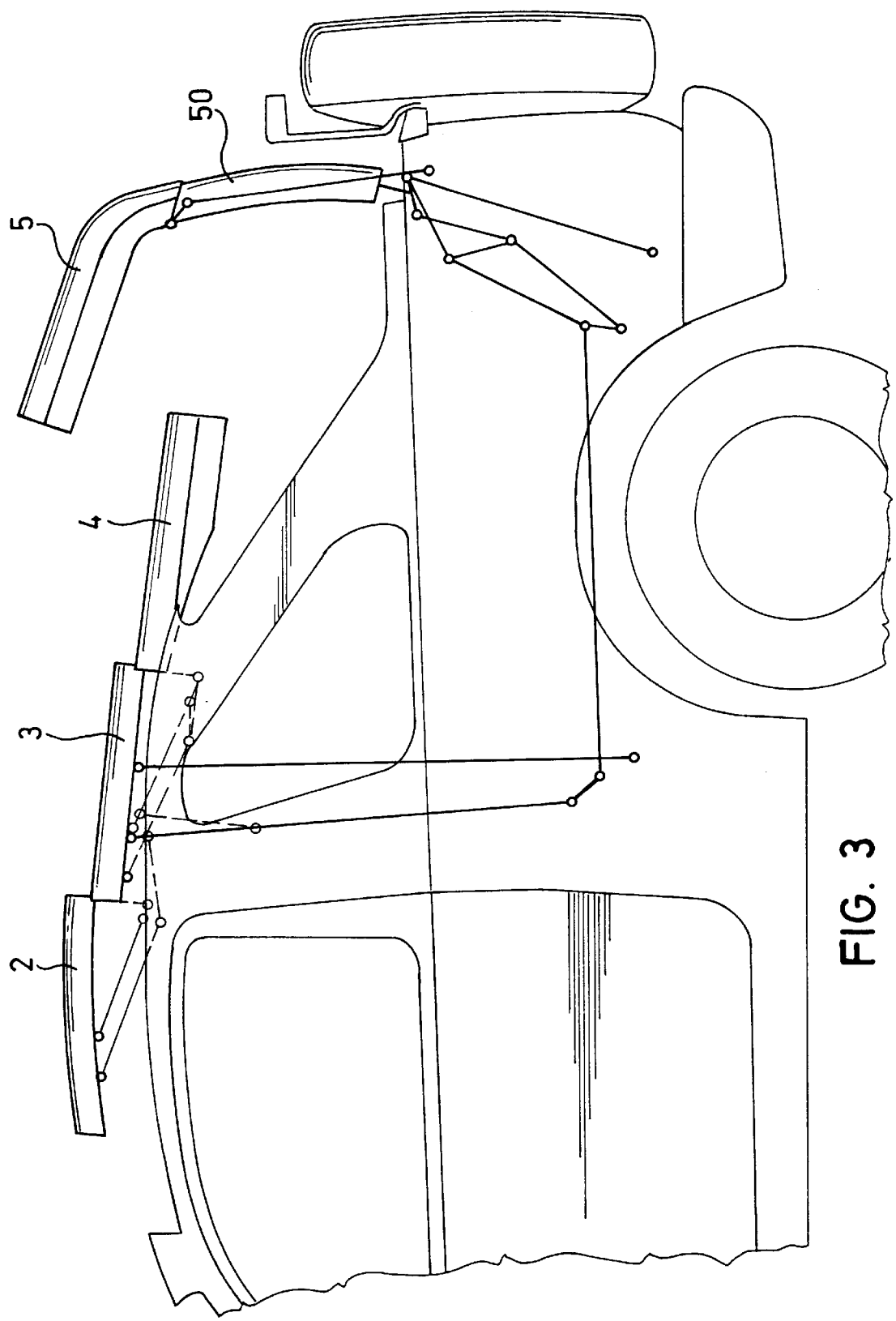
Figure 5:
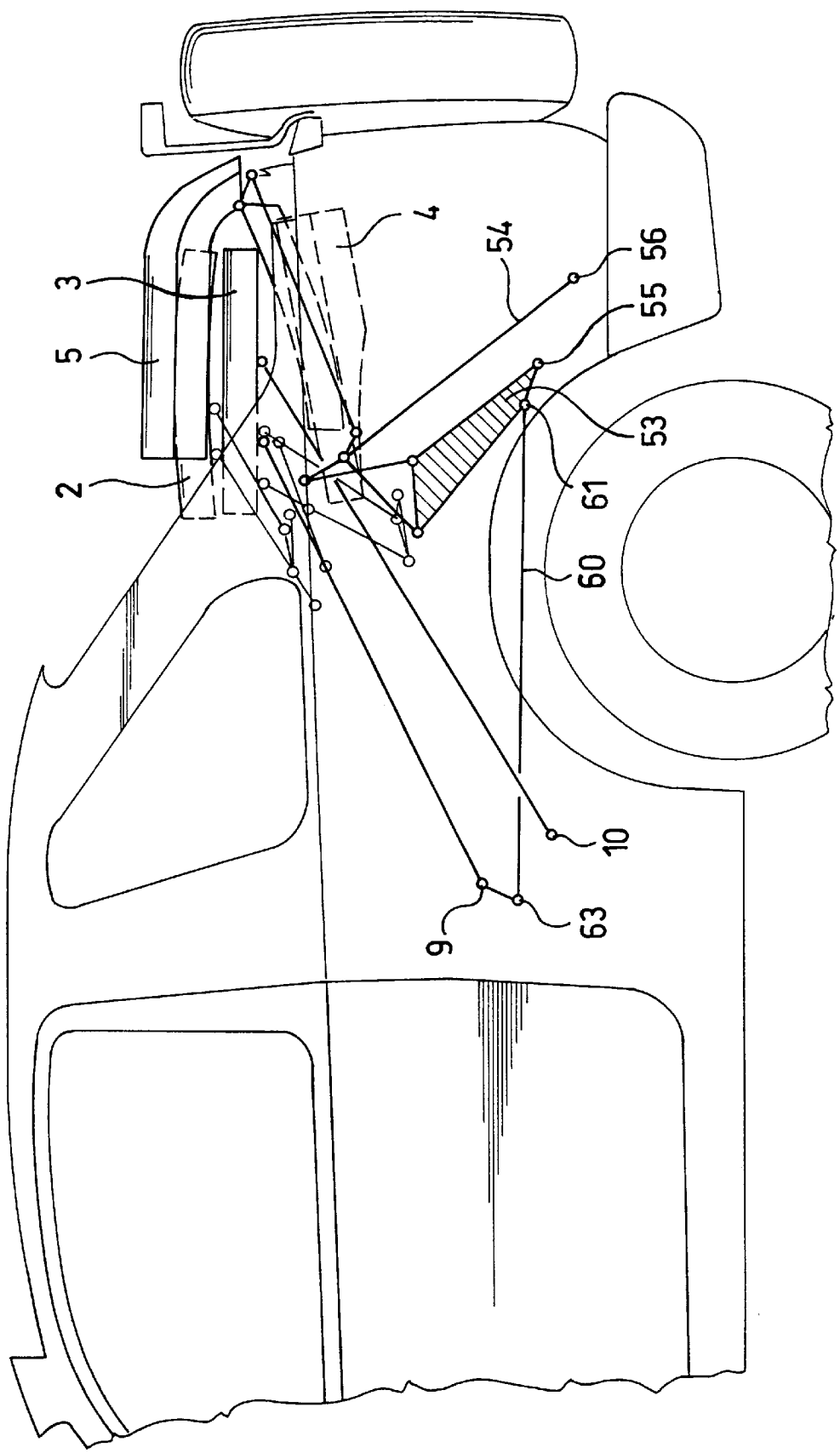

A lowerable, convertible motor vehicle roof 1 which can be moved in whole or in part into a receiving frame, for example, the roof of a station wagon or an all-terrain vehicle, contains a front roof section which has a front roof element 2, a middle roof element 3 and a rear roof element 4 (see, FIGS. 1 & 2) which together with a rear roof element 5 of a rear roof section cover the interior of the vehicle in the closed position shown in FIG. 2. By means of roof or folding roof kinematic elements, which are located on the side edge of the roof elements 2, 3, 4, symmetrically to the lengthwise axis of the motor vehicle, and which are described using the elements which are shown for one side, the motor vehicle roof 1 can be transferred from the closed position (FIGS. 1 & 2) into the open position (FIG. 5). The roof kinematic elements include a four-bar mechanism 6 for supporting the middle roof element 3, which is also called the main roof element. The four-bar mechanism 6 contains a rod 7 which is a front rod with respect to the vehicle, and a rear rod 8. The rods 7, 8 are pivotally coupled to the body in two joints 9, 10 and to the roof element 3 in two joints 11, 12, so that the middle roof element 3 can be lowered to the rear in a parallel pivoting motion around the body-side joints 9, 10. A drive (not shown) engages either the front or the rear rod 7 or 8 and can pivot the four-bar mechanism 6.

The front roof element 2 is coupled to the middle roof element 3 via a front four-bar mechanism 13 which contains a main rod 14 which is pivotally mounted on an arm 15 of the middle roof element 3 in a joint 16, and on its front end, is coupled in a joint 17 to the front roof element 2. The auxiliary rod 18 of the four-bar mechanism 13 is coupled to the front roof element 2 in a joint 19 which is located on the arm 15, which is at a distance to the joint 16, and in a joint 20.

Figure 4:
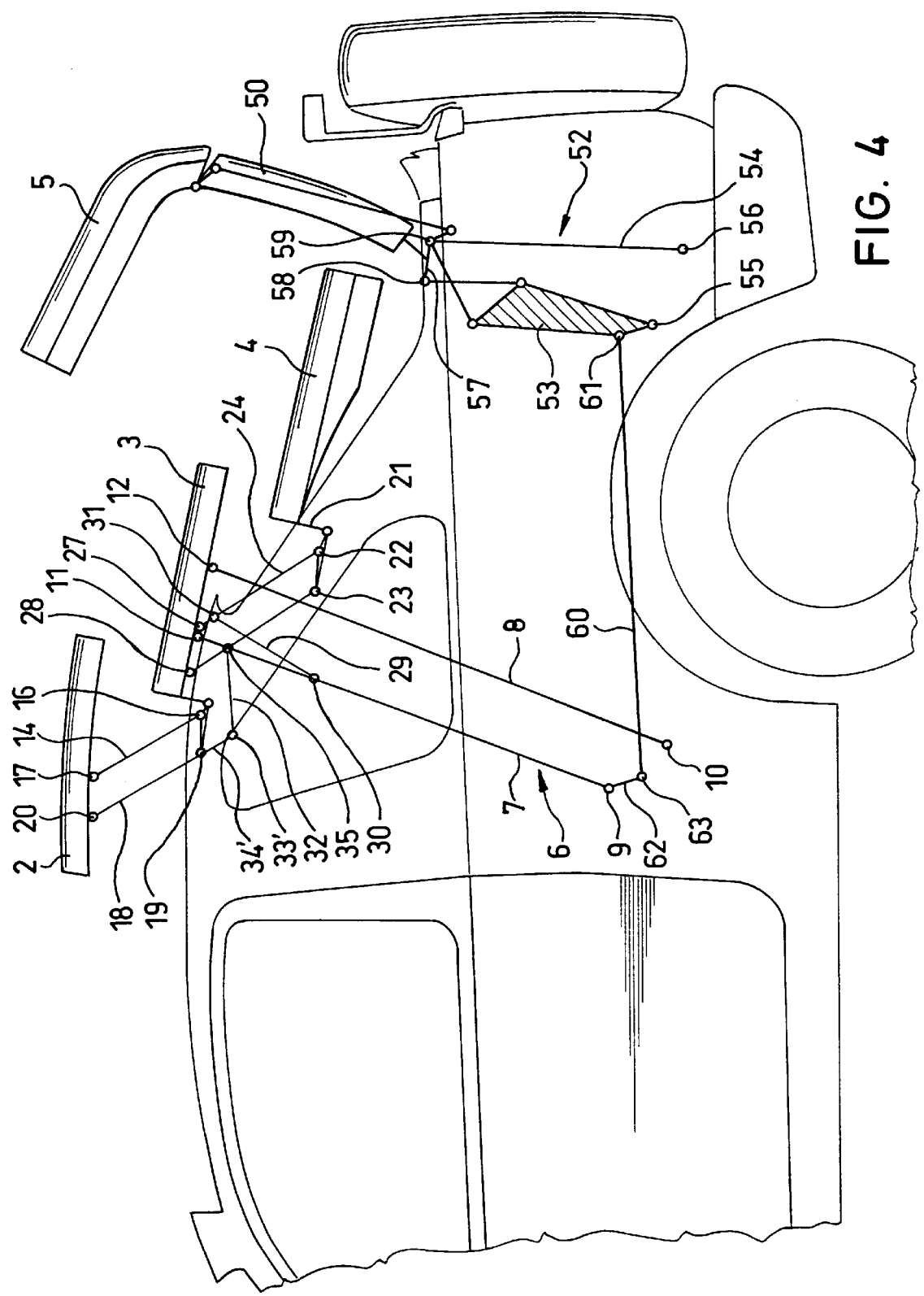

The rear roof element 4 contains an arm 21 with two joints 22, 23 which are spaced apart and on which a main rod 24 and an auxiliary rod 25 of a rear four-bar mechanism 26 are pivotally mounted. On the middle roof element 3, the main rod 24 and the auxiliary rod 25 are coupled in respective joints 27, 28. A coupling rod 29 is pivotally coupled to the front rod 7 of the main four-bar mechanism 6 in a joint 30 and to the main rod 24 in a joint 31. Another coupling rod 32 connects a joint 33, which is located on an extension 34 of the main rod 14 of the front four-bar mechanism 13, with a joint 35 on the auxiliary rod 25 of the four-bar mechanism 26 (see FIG. 1). In the motor vehicle shown in FIGS. 2 to 5, as shown in FIG. 4, the coupling rod 32 is coupled to the joint 33' which is located on the extension 34' of the auxiliary rod 18 of the front four-bar mechanism 13.

In the opening process of the motor vehicle roof 1, the drive moves the main four-bar mechanism 6 together with the middle roof element 3 in a pivoting motion in the direction to the rear stowage position on the motor vehicle (see motion from FIG. 2 to FIG. 3), the middle roof element 3 retaining its roughly horizontal alignment or tilting only slightly. Via the two coupling rods 29, 32, the two four-bar mechanisms 13, 26 for the front and rear roof elements 2, 4 are moved such that the front roof element 2 is pivoted in a roughly parallel alignment to the middle roof element 3 to over it while, conversely, the rear roof element 4 is pivoted in a roughly parallel alignment to the middle roof element 3 to under it. The entire kinematic mechanism of the folding roof thus contains 16 joints and has a single degree of freedom.

The rods are shown simplified in the figures as essentially linear elements, but they can be made elbowed, especially for the front four-bar mechanism 13 which is pivoted up and over the middle roof element 3 in order to enable a space-saving rod arrangement.

The two coupling rods 29, 32 can connect different rods to one another depending on the space conditions to transfer the drive motion from the main four-bar mechanism 6 to the front and rear four-bar mechanisms 13, 26. Thus, for example, the coupling rod 29 can connect the rear rod 8 of the main four-bar mechanism 6 to the auxiliary rod 25, and the coupling rod 32 can connect the main rod 24 of the rear four-bar mechanism 26 to the auxiliary rod 18 of the front four-bar mechanism 13, and other combinations can also be feasibly carried out.

FIGS. 6.1–6.7 schematic depict different alternatives for the type of motion of the front and the rear roof elements 2, 4 to over/under the middle roof element 3.

FIG. 6.1 shows the already described embodiment in which the front roof element 2 can be shifted by means of the four-bar mechanism 13 to over the middle roof element 3 and the rear roof element 4 can be shifted to under the middle roof element 3. FIG. 6.2 shows an alternative with these motions interchanged.

FIG. 6.3 shows front and rear roof elements 2, 4 which are moved by a movement means translationally to over/under the middle roof element 3, while FIG. 6.4 shows an alternative with these motions interchanged.

FIG. 6.5 shows a combination of parallel pivoting of the front roof element 2 to over the middle roof element 3 and translational motion of the rear roof element 4 to under the middle roof element 3, while FIG. 6.6 shows an interchanged motion sequence.

FIG. 6.7 shows a version with a pure pivoting or folding coupling of the roof elements 2, 4 on the middle roof element 3.

Additional embodiments with other combinations can be formed from the basic motions shown.

The main four-bar mechanism 6 can also pivotally support the front or the rear roof element 2, 4 on the body instead of the middle roof element 3.

Figure 7:
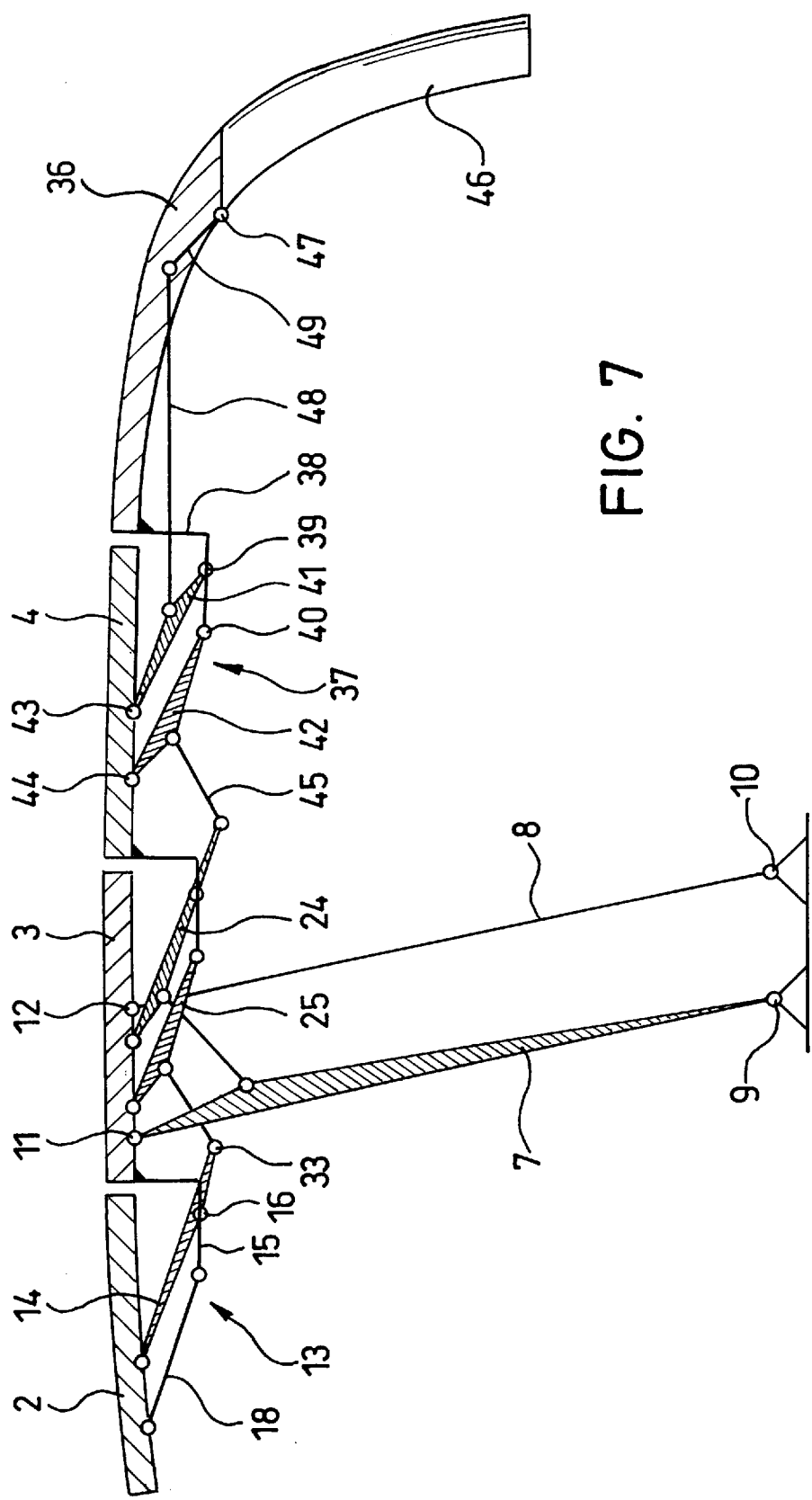
FIG. 7 is a view corresponding to that of FIG. 1 but with a rear roof element additionally attached to the motor vehicle roof.

FIG. 7 shows the motor vehicle roof 1 of FIG. 1 with an additional rear roof element 36 which is pivotally coupled via an additional four-bar mechanism 37 to the rear roof element 4. A bent arm 38 of the rear roof element 36 is pivotally mounted via two joints 39, 40 on two rods 41, 42 of the additional four-bar mechanism 37, the rods 41, 42 in the joints 43, 44 being supported on the rear roof element 4. A coupling rod 45 connects the extension of the main rod 24 to the front rod 42 for transfer of motion. Finally, another rear roof column 46 (D-column) can be supported in a pivot joint 47 on the back end of the rear roof element 36 and can be driven with a pivoting motion via a connecting rod 48 and 49 which is connected to the additional four-bar mechanism for folding-in.

The motor vehicle shown in FIGS. 2 to 5 furthermore contains a rear stowable roof column 50 (D column) with a rear roof part 5 coupled thereto. A bearing means 52 for the roof column 50 contains a rod mechanism with two coupled four-bar mechanisms (not detailed in the Figures). The bearing means 52 is pivotally mounted via two rods 53 and 54 on two body-mounted joints 55 and 56. One roof column rod 57 which bears the roof column 50 is integrated in the rod mechanism and is pivotally mounted on two joints 58 and 59. The rear roof part 5 is driven by means of an auxiliary rod arrangement which is forcibly moved by the bearing means 52.

A drive means can selectively drive the rod 53 or the rod 54 and alternatively also, for example, engage in the joint 55 or the joint 56.

A coupling means in the form of a coupling rod 60 forms the dynamic coupling between the main four-bar mechanism 6 of the middle roof element 3 of the front roof section and the bearing means 52 for the roof column 50. The coupling rod 60 is, on the one hand, coupled to the rod 53 in a joint 61, and on the other hand, to a short projection 62 of the front rod 7 of the main four-bar mechanism 6 in a joint 63. The coupling rod 60 forms a mechanical coupling so that synchronous motion of the roof elements 2, 3, 4 and the roof column 50 matched to one another with the rear roof part 5 is ensured when the motor vehicle roof 1 is being stowed and collisions of these components are precluded. A drive motion can also be transferred via the coupling rod 60 so that only one drive for stowing the front roof elements 2, 3, 4 and the roof column 50 is necessary. This drive can engage either the main four-bar mechanism 6 of the front roof elements 2, 3, 4 or the bearing means 52 of the roof column 50.

Further details and possibilities with regard to the movement mechanism for the rear roof element 5, 36 and roof column 46, 50 can be found in co-pending, commonly assigned U.S. patent application Ser. No. 09/782,511, filed on even date with this application and claiming priority of German Patent Application No. 100 06 290/3 of Feb. 14, 2000.

What is claimed is:

1. Convertible motor vehicle roof, comprising a main roof element and at least one other roof element which are movably joined to one another, and a main bearing mechanism which pivotally mounts the main roof element on a motor vehicle body and transfers the main roof element together with the at least one other roof element coupled thereto into a stowed position during opening of the motor vehicle roof: wherein the at least one other roof element is movable, via a connecting means which is controlled by the main bearing mechanism during movement of the main roof element, while maintaining a roughly parallel position relative to the main roof element, toward the stowed position, wherein the roof elements are vertically disposed one over another in the stowed position and wherein the main roof element and the at least one other roof element is movable to the stowed position while maintaining a roughly horizontal alignment.

2. Motor vehicle roof as claimed in claim 1, wherein the main bearing mechanism is a main four-bar mechanism.

3. Motor vehicle roof as claimed in claim 1, wherein the main roof element is coupled to the at least one other roof element by a four-bar mechanism which is connected to the main bearing mechanism in a motion transferring connection.

4. Motor vehicle roof as claimed in claim 3, wherein the four-bar mechanism is connected via a coupling rod to the elements movable by the main bearing mechanism.

5. Motor vehicle roof as claimed in claim 1, wherein said at least one other roof element comprises roof elements which are supported to move toward one another.

6. Motor vehicle roof as claimed in claim 5, wherein the main roof element is located between said roof elements which comprise front and rear roof elements.

7. Motor vehicle roof as claimed in claim 5, wherein the roof elements are located to one side of the main roof element in a direction of vehicle travel.

8. Motor vehicle roof as claimed in claim 6, wherein the front roof element is displaceable over the main roof element and the rear roof element is displaceable under the main roof element.

9. Motor vehicle roof as claimed in claim 6, wherein the front roof element is displaceable under the main roof element and the rear roof element is displaceable over the main roof element.

10. Motor vehicle roof as claimed in claim 5, wherein the roof elements are attached to the main roof element by connecting means for one of parallel pivoting, translational displacement, and folding around a joint to a respective position in which one of the roof elements is under the main roof element and another is over the main roof element.

11. Motor vehicle roof as claimed in claim 8, further comprising an additional roof element which is movable by an articulated connection, said additional roof element being connected rearward of said rear roof element, said additional roof element being dynamically coupled to the main bearing mechanism.

12. Motor vehicle roof as claimed in claim 1, further comprising a rear section with at least one of a roof element and a roof column element and a rear mechanism for lowering the rear section; wherein the main bearing mechanism is coupled via a coupling to the rear mechanism.

13. Motor vehicle roof as claimed in claim 12, wherein the coupling comprises a coupling rod which connects the main bearing mechanism to the rear mechanism.

14. Convertible motor vehicle roof, comprising: a main roof element and at least one other roof element which are movably joined to one another, and a main bearing mechanism which pivotally mounts the main roof element on a motor vehicle body and transfers the main roof element together with the at least one other roof element coupled thereto into a stowed position during opening of the motor vehicle roof, wherein the at least one other roof element is movable, via a connecting means which is controlled by the main bearing mechanism during movement of the main roof element, while maintaining a roughly parallel position relative to the main roof element, toward the stowed position, wherein the roof elements are vertically disposed one over another in the stowed position, wherein said at least one other roof element comprises roof elements which are supported to move toward one another, and wherein the main roof element is located between said roof elements which comprise front and rear roof elements.

15. Convertible motor vehicle roof, comprising: a main roof element and at least one other roof element which are movably joined to one another, and a main bearing mechanism which pivotally mounts the main roof element on a motor vehicle body and transfers the main roof element together with the at least one other roof element coupled thereto into a stowed position during opening of the motor vehicle roof, wherein the at least one other roof element is movable, via a connecting means which is controlled by the main bearing mechanism during movement of the main roof element, while maintaining a roughly parallel position relative to the main roof element, toward the stowed position, wherein the roof elements are vertically disposed one over another in the stowed position, wherein said at least one other roof element comprises roof elements which are supported to move toward one another, and wherein the main roof element is located between said roof elements which comprise front and rear roof elements, wherein the front roof element is displaceable over the main roof element and the rear roof element is displaceable under the main roof element, and further comprising an additional roof element which is movable by an articulated connection, said additional roof element being connected rearward of said rear roof element, said additional roof element being dynamically coupled to the main bearing mechanism.

16. Convertible motor vehicle roof, comprising: a main roof element and at least one other roof element which are movably joined to one another, and a main bearing mechanism which pivotally mounts the main roof element on a motor vehicle body and transfers the main roof element together with the at least one other roof element coupled thereto into a stowed position during opening of the motor vehicle roof, wherein the at least one other roof element is movable, via a connecting means which is controlled by the main bearing mechanism during movement of the main roof element, while maintaining a roughly parallel position relative to the main roof element, toward the stowed position, wherein the roof elements are vertically disposed one over another in the stowed position, further comprising a rear section with at least one of a roof element and a roof column element and a rear mechanism for lowering the rear section, wherein the main bearing mechanism is coupled via a coupling to the rear mechanism.

* * * * *